United States Patent

Kawashima et al.

[11] Patent Number: 5,176,787
[45] Date of Patent: Jan. 5, 1993

[54] METHOD AND APPARATUS FOR MEASURING THE DIAMETER OF A SILICON SINGLE CRYSTAL

[75] Inventors: Akihiro Kawashima; Tatsuo Sato; Toshio Okawa, all of Tokyo, Japan

[73] Assignee: NKK Corporation, Tokyo, Japan

[21] Appl. No.: 691,701

[22] Filed: Apr. 26, 1991

[30] Foreign Application Priority Data

Apr. 27, 1990 [JP] Japan .................. 2-110384

[51] Int. Cl.⁵ ............................................. C30B 15/22
[52] U.S. Cl. ............................. 156/601; 156/617.1; 156/618.1; 156/620.4; 156/DIG. 64; 422/106; 422/249
[58] Field of Search ............... 156/601, 617.1, 618.1, 156/620.4, DIG. 64; 422/106, 249

[56] References Cited

U.S. PATENT DOCUMENTS

| | | | |
|---|---|---|---|
| 4,350,557 | 9/1982 | Scholl et al. | 156/617.1 |
| 4,565,598 | 1/1986 | Seymour | 156/617.1 |
| 4,794,263 | 12/1988 | Katsuoka et al. | 156/601 |
| 4,871,251 | 10/1989 | Preikschat et al. | 356/336 |
| 4,973,377 | 11/1990 | Katsuoka et al. | 156/618.1 |

FOREIGN PATENT DOCUMENTS 134680 3/1985 European Pat. Off. ......... 156/618.1

1-96089 3/1989 Japan .
64-69590 4/1989 Japan .

Primary Examiner—Robert Kunemund
Attorney, Agent, or Firm—Michael N. Meller

[57] ABSTRACT

A method of measuring the diameter of a silicon single crystal. At intervals of a given rotational period of a pulled single crystal being pulled by the CZ method, optical means samples the luminance distribution of a fusion ring to obtain measured diameter values of the pulled single crystal so that the measured diameter values are processed by a low-pass filter to generate filter output values converted to time series diameter data and the filter output values are subjected to moving averaging to calculate a diameter value. Also, an apparatus for measuring the diameter of a silicon single crystal includes optical means whereby at intervals of a given rotational period of a pulled single crystal being pulled by the CZ method the luminance distribution of a fusion ring is sampled and measured to generate measured diameter values of the pulled single crystal, a low-pass filter for filtering the low-frequency components of the measured diameter values to generate filter output values converted to time series data, and computing means for subjecting the filter output values to moving averaging to calculate a diameter value of the pulled single crystal.

8 Claims, 4 Drawing Sheets

METHOD AND APPARATUS FOR MEASURING THE DIAMETER OF A SILICON SINGLE CRYSTAL

BACKGROUND OF THE INVENTION

The present invention relates to a method and apparatus for measuring the diameter of a silicon single crystal and more particularly to a silicon single crystal diameter measuring method and apparatus whereby during the continuous manufacture of a silicon single crystal while rotating it relative to a crucible the diameter of the pulled single crystal is measured during its pulling.

Referring to FIG. 2 of the accompanying drawings, there is illustrated a schematic diagram, showing a single crystal manufacturing apparatus utilizing the Czochralski method which is well known as a manufacturing method of single crystals of such semiconductor as silicon. It is to be noted that Czochralski method is widely known as a CZ method and also it is generally called as a crystal pulling method.

In the Figure, during the manufacture of a silicon single crystal, contained in a crucible 2 is molten silicon 3 which is heated and melted by a heater 4 so that while rotating a silicon single crystal 1 in a direction opposite to the direction of rotation of the crucible 2 by a turning mechanism which is not shown, the silicon single crystal 1 is gradually pulled from the molten silicon 3 by a pulling apparatus 7 and the crystal is grown in the interfacial region between the molten silicon 3 and the silicon single crystal 1. This silicon single crystal 1 is grown from a seed crystal 1a by crystal growth and the seed crystal 1a is supported by a seed crystal holder 6 connected to the pulling apparatus 7. In the discussion to follow, the silicon single crystal 1 under growth is referred to as a pulled single crystal. Also, the pulling apparatus 7 includes a mechanism for vertically moving the silicon single crystal 1 and a mechanism for rotating the crystal 1 and it is composed of a motor controller 8, a pull motor 9, etc. Thus, it is a well known apparatus and any detailed explanation of its construction will be omitted. The crucible 2 is supported by a lifting mechanism (not shown) in addition to the previously mentioned turning mechanism and it is designed so that even if a crystal is grown, for example, the liquid level is prevented from lowering but maintained constant by the lifting mechanism and the temperature distribution in the vicinity of the liquid surface is not varied.

The pulled single crystal 1 manufactured by the CZ method is later finished into a silicon single crystal ingot of a cylindrical shape and it is thus required that the crystal 1 is pulled with substantially the uniform diameter throughout the whole body portion. For this purpose, the diameter of the pulled single crystal is directly measured during its pulling by the optical means as a video measure 5 and it is pulled while adjusting the pull rate so as to maintain the diameter at the desired value. In this case, the optical means is attached to the crystal pulling apparatus and therefore the fusion ring appearing at the boundary of the pulled single crystal 1 and the liquid surface is measured obliquely from above by a single measuring line, thereby directly measuring the diameter of the pulled single crystal 1.

With the conventional silicon single crystal diameter measuring method and apparatus described, due to the fact that the diameter measuring optical means is attached to the silicon single crystal manufacturing apparatus and the fusion ring is measured obliquely from above with a single measuring line low-frequency noise is superimposed on the resulting measured diameter value under the effects of the rotation of the pulled single crystal and the rotation of the crucible. The superimposed noise increases the error of the measured value. Also, as shown in the schematic diagram of FIG. 3, the pulled single crystal 1 is not formed into a complete round shape due to the effect of crystal habit lines 13 so that when the crystal 1 is pulled while rotating it, if, for example, the diameter in an A direction is measured at a certain timing of a sampling measurement and the diameter in a B direction is measured at another timing, even if there is no change of the diameter with respect to the A direction, a change is caused in the diameter in terms of measurement. In addition, it is unavoidable that high-frequency noise is superimposed on the measured value due to an electrical effect. As a result, the occurrence of these factors causes an increase in variations of the measured diameter value of the pulled single crystal and the measured diameter value becomes unstable and unreliable.

For instance, where the data of such unreliable measured diameter value is used in the diameter control, the pull rate is varied so as to maintain uniform the diameter of the pulled single crystal. However, there is a disadvantage that not only this results in a meaningless control operation if there is in fact no variation in the diameter of the pulled single crystal but also the execution of a control on the basis of such data results in the execution of an erroneous control.

SUMMARY OF THE INVENTION

The present invention has been made with a view to overcoming the foregoing problems and it is the primary object of the invention to provide a method and apparatus for measuring the diameter of a silicon single crystal in which the output of optical means is improved so that any undesired measuring error of a measured diameter value is eliminated to measure a true diameter value.

To accomplish the above object, in accordance with the present invention there is thus provided a silicon single crystal diameter measuring method comprising determining measured diameter values of a pulled single crystal by sampling the luminance distribution of a fusion ring by optical means at intervals of a given rotational period of the pulled single crystal during its pulling by the CZ method, processing the measured diameter values by a low-pass filter to generate filter output values converted to time series diameter data and subjecting the output values to moving averaging to calculate a diameter value.

Also, in accordance with the present invention there is thus provided a silicon single crystal diameter measuring apparatus comprising optical means for measuring by sampling the luminance distribution of a fusion ring at intervals of a given rotational period of a pulled single crystal during its pulling by the CZ method thereby generating measured diameter values of the pulled single crystal, a low-pass filter for filtering the low-frequency components of the measured diameter values to generate filter output values in the form of converted time series data, and a computing unit for subjecting the filter output values to moving averaging to calculate a diameter value of the pulled single crystal.

Then, in the silicon single crystal diameter measuring method and apparatus the low-pass filter is a recursion-type low-pass numerical value filter which is capable of decribing the following equation (1) by using the filter (n−1)th output value with $X_n$ representing the nth value and $Y_n$ representing the nth output value of the filter $$Y_n = (1-A) \cdot X_n + A Y_{n-1} \qquad (I)$$

where
$A = \exp(-2\zeta \cdot \Delta t \cdot f_c)$
$\Delta t$ = sampling interval
$f_c$ = cutoff frequency Also, in the above-mentioned silicon single crystal diameter measuring method and apparatus the moving average calculates a silicon diameter value Zn in the form of the following equation (II) by using the output values Y of the low-pass filter for a given number of rotations of the silicon single crystal $$Z_n = \sum_{i=n-m-1}^{n} Y_i / m \qquad (II)$$

wherein, m = number of filter outputs to calculate moving average.

In accordance with the silicon single crystal diameter measuring method and apparatus of the present invention, a pulled single crystal which is out of round in shape due to mainly the existence of crystal habit lines such as shown in FIG. 3, is initially measured by a plurality of times (e.g., several tens times) of sampling from many different directions at intervals of a given rotational period (e.g., every rotation) by the optical means to obtain measured diameter values and the signal of these measured values is passed through the low-pass filter thereby calculating a diameter value by the moving average method. As a result, the high-frequency noise component due to an electric effect is removed from the measured diameter value signal passed through the low-pass filter and then moving average is calculated to remove low-frequency noise due to the effects of the rotation of the pulled single crystal and the rotation of the crucible, thereby obtaining smooth diameter value data having a reduced measuring error. In this way, there is no danger of making any overestimation or underestimation of measured diameter values of all directions over the whole area in the pull direction of the pulled single crystal thereby enhancing the reliability of a measured diameter value.

DESCRIPTION OF THE PREFERRED EMBODIMENTS

Figure 1:
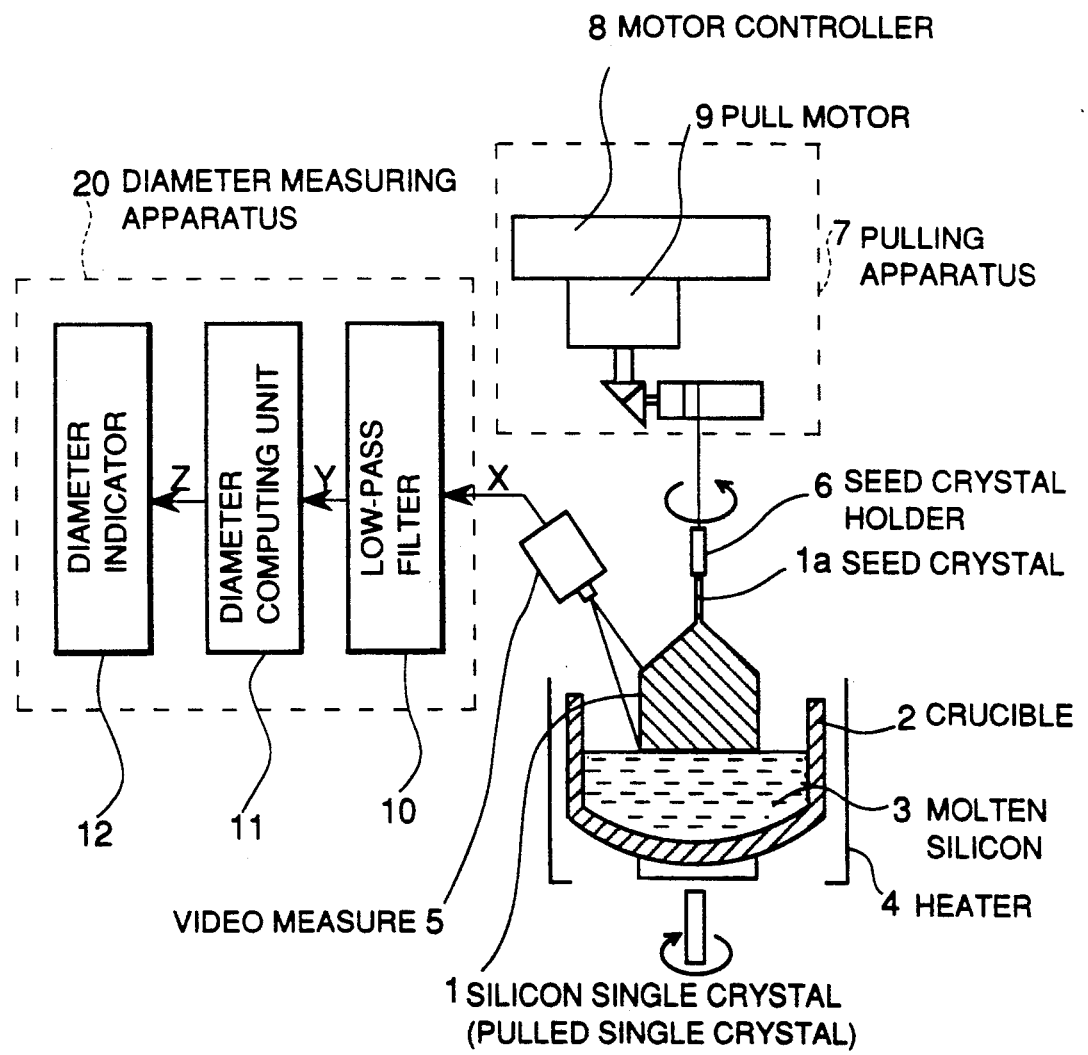
FIG. 1 is a schematic diagram showing the constructions of an apparatus measuring the diameter of a silicon single crystal according to an embodiment of the present invention.

Referring to FIG. 1, there is illustrated a schematic diagram showing the construction of an embodiment of a silicon single crystal diameter measuring apparatus according to the present invention. The construction of the embodiment apparatus of FIG. 1 and an embodiment of a diameter measuring method according to the invention which utilizes the apparatus will now be described.

Figure 2:
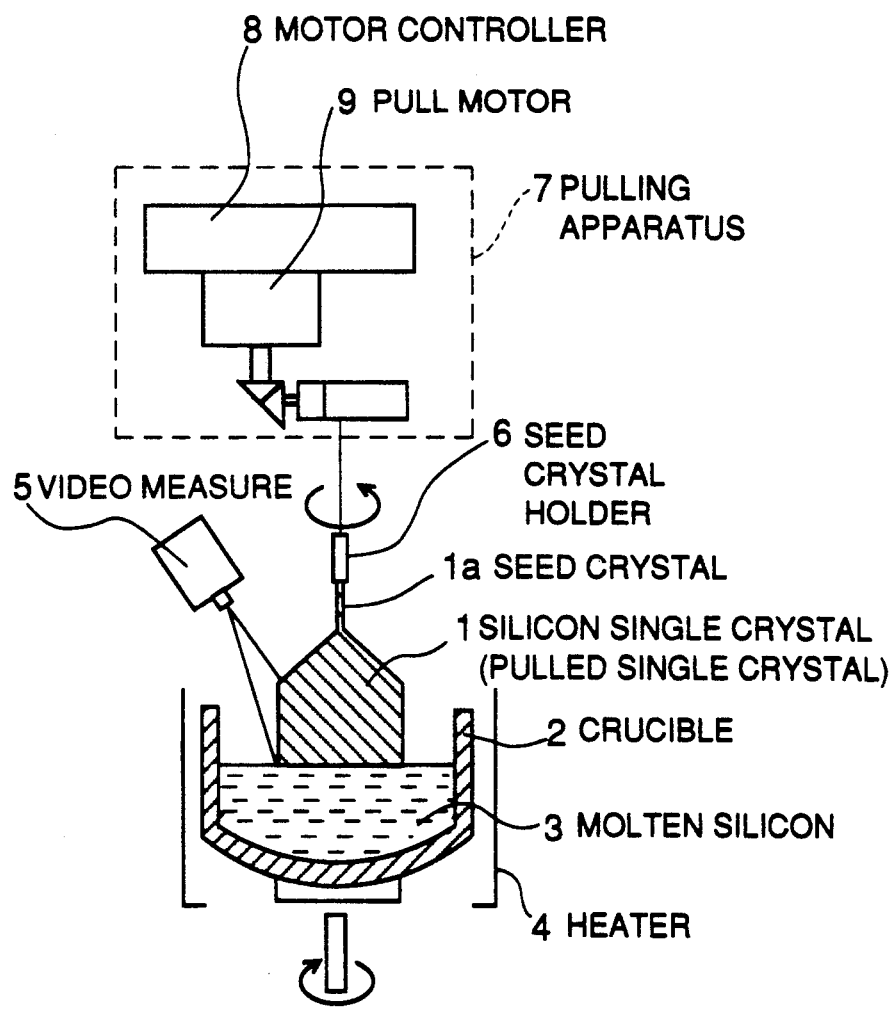
FIG. 2 is a schematic diagram showing the construction of a conventional silicon single crystal manufacturing apparatus according to the Czochralski method.

In FIG. 1, component parts designated by numerals 1 to 9 are indentical or equivalent to the component parts used in the conventional apparatus of FIG. 2 and will not be described. Numeral 10 designates a low-pass filter whereby high-frequency noise components in measured diameter values X of a sample output from a video measure 5 are eliminated to generate filter output values Y, and numeral 11 designates a diameter computing unit for obtaining the moving average of the time series filter output values to generate a diameter value Z which is free of low-frequency noise components. Numeral 12 designates a diameter indicator for making an indication in accordance with the diameter value Z. It is to be noted that the low-pass filter 10 is a recursion-type low-pass numerical filter. A silicon single crystal diameter measuring apparatus 20 is constructed in the manner just described.

The silicon single crystal diameter measuring apparatus constructed as described is one which is constructed by adding the low-pass filter 10, the diameter computing unit 11, etc., to the conventional crystal pulling apparatus of FIG. 2 and it features that the below-mentioned diameter measuring method is performed so that measuring error components unavoidable to measured diameter values produced by the optical means are removed, thereby generating a diameter value which is high in reliability.

Figure 4:
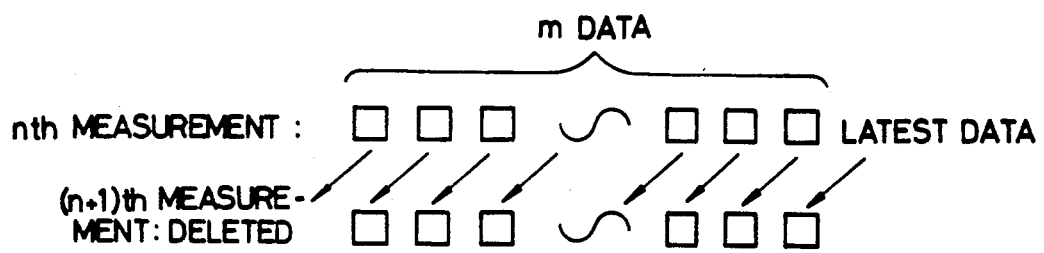
FIG. 4 is a schematic diagram for explaining the manner of a data storage method prior to moving averaging.

Next, in connection with the embodiment of the diameter measuring method according to the present invention, the algorithms in the low-pass filter 10 and the diameter computing unit 11 will be described. Basically, use is made of the measured diameter values X measured by the video measure 5 composed of the conventional optical means or an optical camera. As shown in the embodiment of FIG. 1, a sampled and measured nth measured diameter value $X_n$ is passed through the recursion type low-pass filter 10 thereby generating a filter output value $Y_n$ shown by equation (1) as diameter data which is free of high frequency noise. In equation (1), represented by $Y_{n-1}$ is the (n−1)th filter output value $$Y_n = (1-A) X_n + A Y_{n-1} \qquad (I)$$

where
$A = \exp(2\pi \cdot \Delta t\, f_c)$
$\Delta t$ = sampling interval
$f_c$ = cutoff frequency In this case, the filter output value $Y_n$ is stored in the internal memory of the diameter computing unit 11 which is not shown. The manner of storage is shown by the schematic diagram of FIG. 4. The memory capacity is sufficient to store a number of Y corresponding to some rotations (m output values) so that as shown in FIG. 4, the data are successively updated each time the measurement of $Y_n$ is made as in the case of the nth to (n+1)th measurements, thereby deleting the oldest diameter data. In the words, the lastest m time series diameter data are stored in the memory.

Then, the time series diameter data Y are subjected to the moving averaging shown by equation (II) in the diameter computer unit 11 thereby generating a true diameter value $Z_n$:

$$Z_n = \sum_{i=n-m-1}^{n} Y_i/m \quad \text{(II)}$$

The foregoing are the algorithms showing the feature of the diameter measuring method according to the present invention so that in accordance with this measuring method measured diameter values $X_n$ produce filter output value Y which are free of high frequency noise and the filter output values $Y_n$ produce a diameter value $Z_n$ which is free of low-frequency noise. As a result, in accordance with this diameter measuring method the measured diameter values $X_n$ of the pulled single crystal 1 will be neither overestimated nor underestimated and it is possible to accomplish the measurement of a diameter value $Z_n$ which is high in validity.

Figure 3:
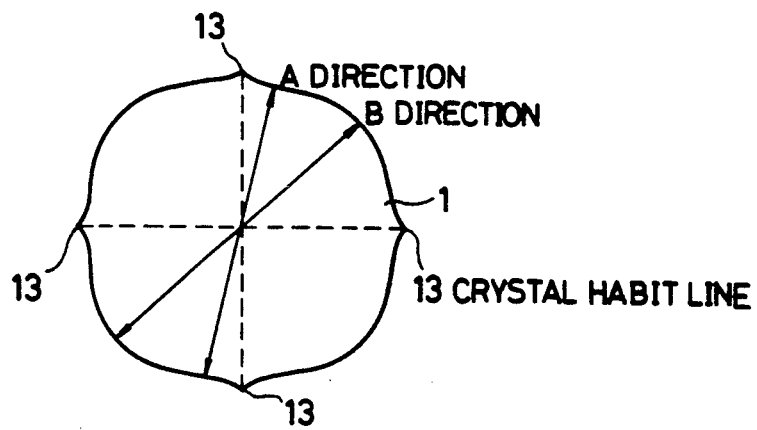
FIG. 3 is a schematic diagram showing a section of the ordinary pulled single crystal and a diameter measuring method.

A description will now be made of a working example in which the diameter value of a pulled single crystal was actually measured by use of the above-mentioned diameter measuring apparatus. In accordance with the present embodiment, the diameter of a pulled single crystal rotating at 20 rmp was measured once for every 0.1 second and passed through the low-pass filter 10 which attenuated high-frequency noise of higher than 0.16 $H_z$. The resulting time series diameter data (100 data) for about 3 rotations are sequentially subjected to moving average at intervals of 1.0 second thereby calculating the diameter. The reason for selecting the cutoff frequency $f_c$, of the low-pass filter 10 to be 0.16 $H_z$ will now be explained. Where the silicon single crystal is pulled in the direction of a crystallographic axis orientation 100, as shown in FIG. 3, four crystal habit lines 13 appear at equal intervals of 90 degrees. When the silicon single crystal is rotated at 20 rpm, the noise due to the four crystal habit lines 13 has a frequency of 1.3 $H_z$. In single crystal itself being rotated at 20 rpm and the rotation of hte crucible 3 at 10 rpm causes noise of 0.16 $H_z$. The actual frequency analysis of the output signal of the video measure 5 shows that the spectrum reaches the peak at 0.16, 0.33 and 1.3 $H_z$, respectively. In view of this fact, the lowest one of these frequency $f_c$. The actual examples of measurement of the diameter of pulled single crystals under the above-mentioned measuring conditions will now be explained.

Figure 5:
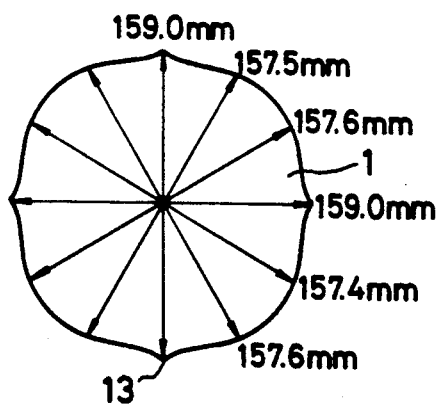
FIG. 5 is a sectional view for explaining the actual measured values of the diameter of the ordinary pulled single crystal.

Referring first to FIG. 5, there is illustrated a schematic diagram showing the reference results of the on-line (off-line) measurement of the diameter at the actual section of a silicon signal crystal 1 removed from the pulling apparatus after the completion of a given crystal growth. As will be seen from the Figure, the values of the diameter in the respective directions showed small variations with respect to one another centering on 157.6 mm and also crystal habit lines of 159.0 mm in diameter were observed. With the exclusion of the diameter values at the portions of the crystal habit lines, however, it can be said that a crystal of a round shape was actually pulled with a deviation within a given tolerance (e.g., ±0.5 mm).

Figure 6:
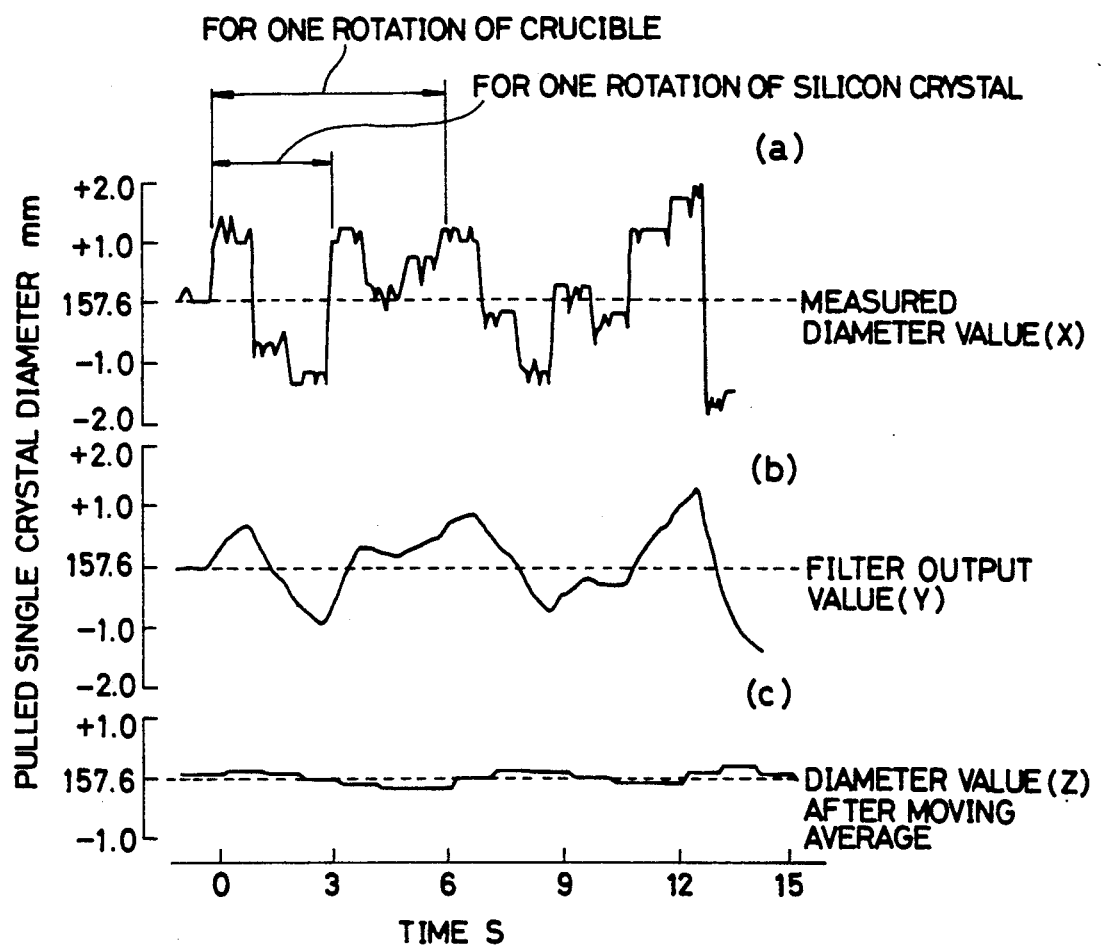
FIG. 6 is a graph showing a part of actual measurement data useful for explaining the filtering effect of the diameter measuring method according to the present invention.

On the other hand, FIG. 6 is a graph showing a part of the actual measurement data for explaining particularly the filtering effect provided by the diameter measuring method according to the present invention. In FIG. 6, (a) shows the output of the video measure 5 or the measured diameter values X, (b) the output of the low-pass filter 10 or the filter output values Y, and (c) the output of the diameter computing unit 11 or the diameter value Z after the moving averaging, with the abscissa representing the measuring time and the ordinate representing the amount of deviation centering the true diameter value of a pulled single crystal.

As will be seen from FIG. 6, it is evident that high-frequency noise caused by the crystal habit lines and the electric effects is superimposed on the measured diameter values X of the pulled single crystal 1 generated from the video measure 5 as shown in FIG. 6(a). In addition, low-frequency noise due to the effects of the rotation of the pulled single crystal and the rotation of the crucible 3 is also superimposed thus involving the deviation (the difference between the maximum value and the minimum value) of ±1.6 mm with respect to a diameter of 157.6 mm. However, the filter output values Y involve the deviation of ±1.1 mm and the high-frequency noise is removed as shown in FIG. 6(b). However, the low-frequency noise due to the rotation of the pulled single crystal and the rotation of the crucible still remain unremoved. Then, it is seen that by effecting the moving averaging, there results smooth data having the deviation of ±0.3 mm as shown in FIG. 6(c) and thus a true value Z is measured with the deviation being less than a given value.

While, in the above-described embodiment, the silicon single crystal is pulled in the crystal graphic axis orientation direction or the 100 direction, even if the single crystal is pulled in any other crystallographic axis orientation direction or 111 direction, it is apparent from the foregoing description that the diameter measuring method according to the present invention can be applied without any inconvenience.

As described hereinabove, in accordance with the silicon single crystal diameter measuring method and apparatus of the present invention, by virtue of the fact that the sampled measured diameter values generated as the output of the optical means provided for the purpose of controlling the diameter of a pulled single crystal of the crystal pulling apparatus according to the CZ method, are passed through and generated from the low-pass filter and the resulting time series output values are subjected to moving averaging to calculate a diameter value, there is no danger of overestimating or underestimating the measured diameter values and it is possible to measure the diameter value of a silicon single crystal which is being pulled and which is also free of low-frequency and high-frequency noise.

Further, where such diameter data is utilized for the control of maintaining constant the diameter of a silicon single crystal to manipulate the pull rate, there is an attendant effect that the stable pulling without the danger of causing a rapid change in the manipulated variable in the pull rate) can be effected, thereby producing the crystal having of the uniform material.

What is claimed is:

1. A silicon single crystal diameter measuring method for measuring a diameter of a pulled single crystal rotated relative to a crucible, said method comprising the steps of:

sampling a luminance distribution of a fusion ring by optical means at intervals of a given rotational period of said pulled single crystal to obtain measured diameter values of said pulled single crystal;

processing said measured diameter values by a low-pass filter to generate filter output values converted to time series diameter data; and subjecting said filter output values to moving averaging to calculate a diameter value of said pulled single crystal.

2. A silicon single crystal diameter measuring method according to claim 1, where said low-pass filter is a recursion-type low-pass numeral filter whereby the following equation (I) is described with $X_n$ representing an nth measured diameter value and Yn representing an nth filter output value, and using said $X_n$ and $Y_n$, and a(n−1)th filter output value $Y_{n-1}$ $$Y_n = (1-A)X_n + A\ Y_{n-1} \qquad (I)$$

where
$A = \exp(-2\pi \cdot \Delta t \cdot f_c)$
$t$ = sampling interval
$f_c$ = cutoff frequency 3. A silicon single crystal diameter measuring method according to claim 1, wherein the moving average of said filter output values is calculated in such a manner that a diameter value $Z_n$ is calculated from the following equation (II) by using filter output values Y from (n−m−1)th to nth order $$Z_n = \sum_{i=n-m-1}^{n} Y_i/m \qquad (II)$$

where, m = number of filter outputs to calculate moving average.

4. A silicon single crystal diameter measuring apparatus for measuring a diameter of a pulled single crystal rotated relative to a crucible, said apparatus comprising;

optical means for sampling and measuring a luminus distribution of a fusion ring at intervals of a given rotational period of said pulled single crystal to output measured diameter values of said pulled single crystal;

a low-pass filter for filtering low-frequency components of said measured diameter values to generate filter output values converted to time serious data; and computing means for subjecting said filter output values to moving averaging to calculate a diameter value of said pulled single crystal.

5. A silicon single crystal diameter measuring apparatus according to claim 4, wherein said low-pass filter is a recursion-type low-pass numerical filter capable of describing the following equation (I) with $X_n$ representing an nth measured diameter value and $Y_n$ representing an nth filter output value, and using said $X_n$ and $Y_n$ and (n−1)th filter output value $Y_{n-1}$ $$Y_n = (1-A)X_n + A\ Y_{n-1} \qquad (I)$$

where
$A = \exp(-2\pi \cdot \Delta t \cdot f_c)$
$\Delta t$ = sampling interval
$f_c$ = cutoff frequency 6. A silicon crystal single crystal diameter apparatus according to claim 4, wherein said computing means calculates the nth diameter value Zn according the following equation (II) by using filter values (n−m−1)th to nth order $$Z_n = \sum_{i=n-m-1}^{n} Y_i/m \qquad (II)$$

where, m = number of filter outputs to calculate moving average.

7. A silicon single crystal diameter measuring method according to claim 2, wherein the moving average of said filter output values is calculated in such a manner that a diameter value $Z_n$ is calculated from the following equation (II) by using filter output values Y from (n−m−1)th to nth order $$Z_n = \sum_{i=n-m-1}^{n} Y_i/m \qquad (II)$$

where, m = number of filter outputs to calculate moving average.

8. A silicon crystal single crystal diameter apparatus according to claim 5, wherein said computing means calculates the nth diameter value Zn according the following equation (II) by using filter values (n−m−1)th to nth order $$Z_n = \sum_{i=n-m-1}^{n} Y_i/m \qquad (II)$$

where, m = number of filter outputs to calculate moving average.

* * * * *